United States Patent
Seifried

(10) Patent No.: US 10,449,621 B2
(45) Date of Patent: Oct. 22, 2019

(54) MAGNETIC ARC WELDED PISTON ASSEMBLY

(71) Applicant: Mahle International GmbH, Stuttgart (DE)

(72) Inventor: Matthias Seifried, Boesingen (DE)

(73) Assignee: Mahle International GmbH (DE)

( * ) Notice: Subject to any disclaimer, the term of this patent is extended or adjusted under 35 U.S.C. 154(b) by 122 days.

(21) Appl. No.: 14/688,492

(22) Filed: Apr. 16, 2015

(65) Prior Publication Data

US 2015/0314388 A1    Nov. 5, 2015

Related U.S. Application Data

(60) Provisional application No. 61/986,943, filed on May 1, 2014.

(51) Int. Cl.
| | |
|---|---|
| B23K 11/04 | (2006.01) |
| B23K 9/08 | (2006.01) |
| F02F 3/00 | (2006.01) |
| B23K 101/00 | (2006.01) |

(52) U.S. Cl.
CPC ............. *B23K 11/04* (2013.01); *B23K 9/08* (2013.01); *F02F 3/003* (2013.01); *B23K 2101/003* (2018.08); *F02F 2003/0061* (2013.01)

(58) Field of Classification Search
CPC .... B23K 11/04; B23K 2201/003; B23K 9/08; B23K 13/015; B23K 13/06; B23K 20/023; B23K 20/028; B23K 20/12; B23K 20/129; B23K 20/227; B23K 20/24; B23K 2203/04; B23K 2203/06; F02F 2003/0061; F02F 3/003; B23P 15/10

USPC ............. 219/100, 121, 122, 123, 617, 635; 123/123, 193.6; 29/29, 888.044

See application file for complete search history.

(56) References Cited

U.S. PATENT DOCUMENTS

| | | | | |
|---|---|---|---|---|
| 4,273,986 A | * | 6/1981 | Edson | B23K 9/08 219/100 |
| 5,117,084 A | * | 5/1992 | Kuchuk-Yatsenko | B23K 9/282 219/100 |
| 7,654,240 B2 | * | 2/2010 | Jarrett | F02F 3/0023 123/193.6 |
| 8,161,935 B2 | * | 4/2012 | Bing | B23K 13/02 123/193.6 |
| 2009/0139481 A1 | * | 6/2009 | Messmer | F02F 3/0023 123/193.6 |
| 2009/0241770 A1 | * | 10/2009 | Blythe | F02B 77/04 92/260 |
| 2009/0260593 A1 | * | 10/2009 | Messmer | F02F 3/0023 123/193.6 |

(Continued)

*Primary Examiner* — Tu B Hoang
*Assistant Examiner* — Vy T Nguyen
(74) *Attorney, Agent, or Firm* — Fishman Stewart PLLC

(57) ABSTRACT

A piston and method of making the same includes providing a piston lower part defining a piston axis and at least a portion of the upper combustion bowl surface, and assembling a piston upper part to the piston lower part. The piston upper and lower parts cooperate to define at least in part a cooling gallery extending annularly about the piston. The method further includes bringing the piston upper and lower parts together along respective upper and lower mating surfaces and inducing an electric current between the upper and lower mating surfaces while the upper and lower mating surfaces are in contact.

14 Claims, 8 Drawing Sheets

(56) References Cited

U.S. PATENT DOCUMENTS

| | | | |
|---|---|---|---|
| 2009/0294425 A1* | 12/2009 | Lohken | B23K 9/08 |
| | | | 219/133 |
| 2010/0050862 A1* | 3/2010 | Kemnitz | F02F 3/003 |
| | | | 92/260 |
| 2010/0098483 A1* | 4/2010 | Toepker | B23K 11/14 |
| | | | 403/271 |
| 2011/0197845 A1* | 8/2011 | Flowers | F02F 3/003 |
| | | | 123/193.6 |
| 2012/0037111 A1* | 2/2012 | Scharp | B23K 20/129 |
| | | | 123/193.6 |
| 2012/0037112 A1* | 2/2012 | Muscas | F02F 3/003 |
| | | | 123/193.6 |
| 2012/0037115 A1* | 2/2012 | Schnaiter | B23K 11/04 |
| | | | 123/193.6 |
| 2012/0222644 A1* | 9/2012 | Bing | B23K 26/28 |
| | | | 123/193.6 |
| 2012/0222645 A1* | 9/2012 | Edel | F02F 3/003 |
| | | | 123/193.6 |
| 2015/0247474 A1* | 9/2015 | Evers | F02F 3/0084 |
| | | | 123/193.6 |
| 2016/0061142 A1* | 3/2016 | Roelofs | B23K 13/015 |
| | | | 92/260 |

* cited by examiner

MAGNETIC ARC WELDED PISTON ASSEMBLY

This application claims priority to U.S. Provisional Application Ser. No. 61/986,943, filed on May 1, 2014, the contents of which are hereby expressly incorporated by reference in their entirety.

BACKGROUND

Internal combustion engine manufacturers are constantly seeking to increase power output and fuel efficiency of their products. One method of generally increasing efficiency and power is to reduce the oscillating mass of an engine, e.g., of the pistons, connecting rods, and other moving parts of the engine. Efforts to increase engine power and/or efficiency also may also result in an increase in pressure and/or temperature within the combustion chamber during operation.

Engines, and in particular the pistons of the engine, are therefore under increased stress as a result of these reductions in weight and increased pressures and temperatures associated with engine operation. Piston cooling is therefore increasingly important for withstanding the increased stress of such operational conditions over the life of the engine.

To reduce the operating temperatures of piston components, a cooling gallery may be provided about a perimeter of the piston. A coolant such as crankcase oil may be introduced to the cooling gallery, and may be distributed about the cooling gallery by the reciprocating motion of the piston, thereby reducing the operating temperature of the piston. At the same time, the cooling galleries may increase overall complexity of the piston assembly and manufacturing of the same.

Known methodologies for securing piston components together may require certain compromises in the cooling gallery configuration. For example, friction welding creates relatively large weld curls which occupy space within the gallery and thereby reduce an overall volume of the cooling gallery. Laser welding may create weld spatter that adheres to interior surfaces of the cooling gallery, generally requiring additional cleanup or machining after the welding process is completed. Induction heating, while resulting in reduced material waste of the joined components such as weld curls or spatter, generally requires relatively large induction coils to be interposed between the piston components being joined. The delay required to allow removal of the coils from between the two components before they are brought into contact after heating necessarily results in a loss of at least some heat energy, thereby creating a need for additional energy to be introduced into the joint to adequately join the components.

Accordingly, there is a need for a piston and manufacturing process that addresses the above problems.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Exemplary illustrations are provided herein of a piston and method of making the same. An exemplary method generally includes providing a piston lower part defining a piston axis and at least a portion of the upper combustion bowl surface, and assembling a piston upper part to the piston lower part. The piston upper and lower parts cooperate to define at least in part an annular cooling gallery extending about the piston. The method may further include bringing the piston upper and lower parts together along respective upper and lower mating surfaces and inducing an electric current between the upper and lower mating surfaces while the upper and lower mating surfaces are in contact. In one exemplary approach, electrodes are applied to the piston to induce current through the upper and lower mating surfaces.

Figure 1:
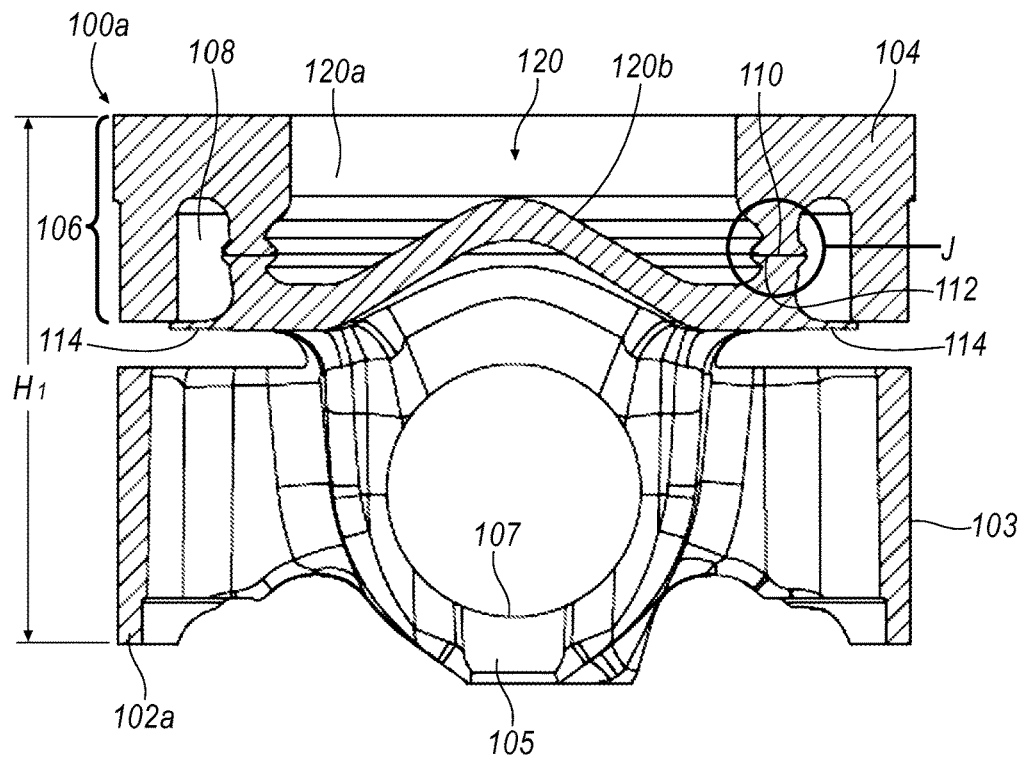
FIG. 1 is a sectional view of an exemplary piston assembly.
Figure 2:
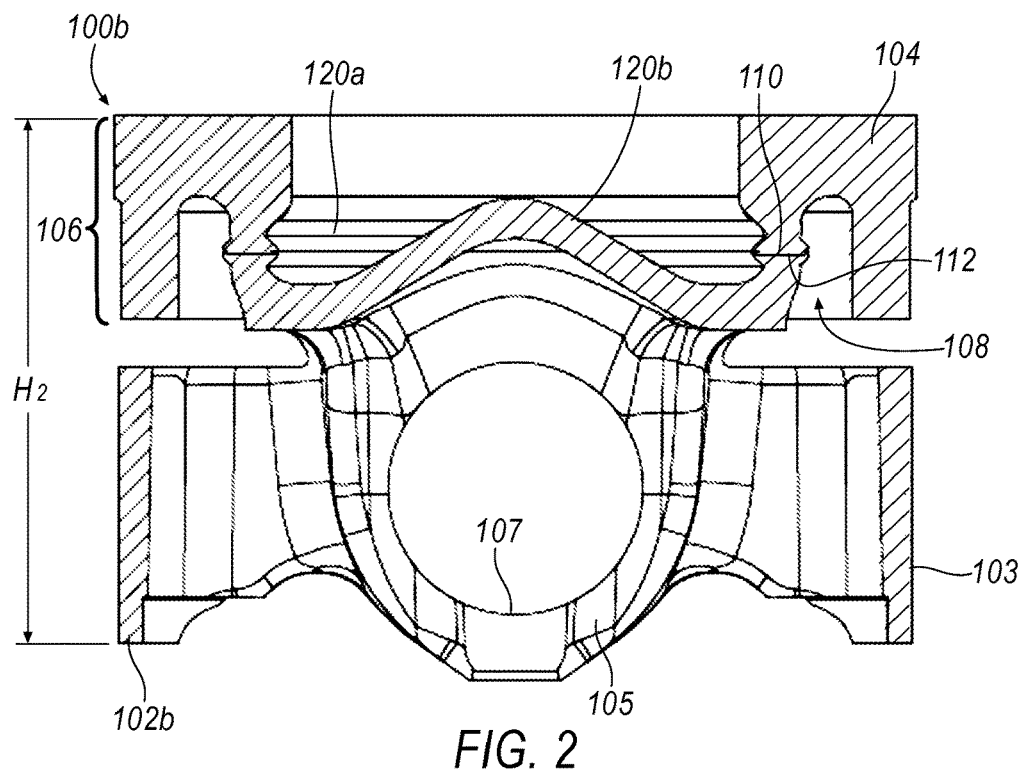
FIG. 2 is a sectional view of another exemplary piston assembly.

Referring now to FIG. 1, an exemplary piston 100a is illustrated. Exemplary pistons may include a piston upper part 104 and a piston lower part 102a (or 102b, as shown in FIG. 2, described further below) that are joined along corresponding upper and lower mating surfaces 110, 112 thereof, respectively, which thereby define an annular joint J of the piston 100. The upper piston part 104 may define a ringland 106 configured to receive one or more piston or oil control rings (not shown) within one or more corresponding piston ring grooves (not shown). The lower piston part 102a may define a skirt 103 configured to support the piston during reciprocal motion by sliding or interfacing with cylindrical bore surfaces (not shown) of an internal combustion engine. The piston lower part 102a may also define two piston pin bosses 105 having piston pin bores 107 configured to receive a piston pin, e.g., for selectively securing a connecting rod (not shown) to the piston.

The upper and lower piston parts 104, 102 may generally cooperate to define a cooling gallery 108 extending annularly about the piston 100a. As shown in FIG. 1, the lower piston part 102a may include a lower flange 114, which generally defines a lower border of the cooling gallery 108, and generally encloses an annular space defined by the piston upper part 104, thereby generally defining a substantially closed cooling gallery 108. The closed cooling gallery 108 may receive coolant or lubricant via one or more apertures (not shown), which may receive a coolant or lubricant from a coolant jet (not shown) configured to circulate oil from an engine crankcase. The cooling gallery 108 may permit coolant or lubricant to exit back to the crankcase via one or more apertures (not shown). While the lower flange 114 is illustrated as being in contact with a lower edge of the ringland 106 to generally close off the gallery, in some exemplary illustrations, a gap between the radially outer end of the lower flange 114 and the lower edge of the ringland 106 may be provided to allow ingress/egress of a coolant from the cooling gallery.

The upper and lower mating surfaces 110, 112 of the piston upper and lower parts 104, 102, respectively, may be joined along a combustion bowl 120 that extends along an upper surface of the piston 100*a*, for example as shown in FIGS. 1 and 2. As will be described further below, the upper and lower mating surfaces 110, 112 may be joined in a welding process where an electric current is used to generally heat the upper and lower piston parts 104, 102 adjacent the upper and lower mating surfaces 110, 112.

Turning now to FIG. 2, another exemplary piston 100*b* is illustrated. The piston 102*b* is substantially the same as piston 100*a* shown in FIG. 1. However, the piston lower part 102*b* in FIG. 2 lacks the lower flange 114 shown in the piston 100*a* of FIG. 1. Accordingly, the cooling gallery 108 defined by the upper and lower piston parts 104, 102*b* is generally open to a space beneath the cooling gallery 108. The generally open cooling gallery may generally more freely allow ingress and egress of a coolant, e.g., by way of an incoming cooling jet. Moreover, a cover plate (not shown) may be used to partially or fully enclose the cooling gallery 108 of the piston 102*b*.

The generally two-piece construction of the pistons 100*a*, 100*b* (collectively, 100) shown in FIGS. 1 and 2, i.e., with the piston upper and lower parts 104 and 102*a*, 102*b*, may generally allow flexibility in regard to the size and shape of the piston upper and lower parts 104, 102 and resulting piston 100, e.g., allowing a lower overall compression height and/or center of gravity of the piston. Moreover, the two-piece construction may also facilitate the forming of more complex shapes within the cooling gallery 108 to allow greater ease of manufacturing of effectively sized galleries that provide enhanced cooling ability.

The upper and lower piston parts 104, 102 may be formed of any material that is convenient. In one exemplary approach the upper and lower piston parts 104, 102 are each form of a steel material. In other exemplary approaches, the upper and lower piston parts 104, 102 are formed of different materials. In approaches where different materials are used for the upper and lower parts 104, 102, materials may be selected for each part that are specialized for the function of the upper and lower parts 104, 102, respectively. Merely as an example, a more temperature resistant material may be selected for the upper part 104, which generally is positioned near the most extreme temperatures and pressures experienced by the piston 100 during operation.

Figure 3A:
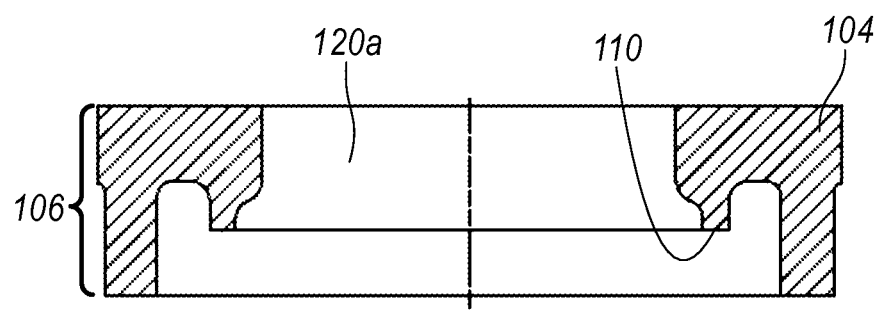
FIGS. 3A and 3B are top and sectional views, respectively, of an upper part used to form the exemplary piston of FIG. 1.
Figure 3B:
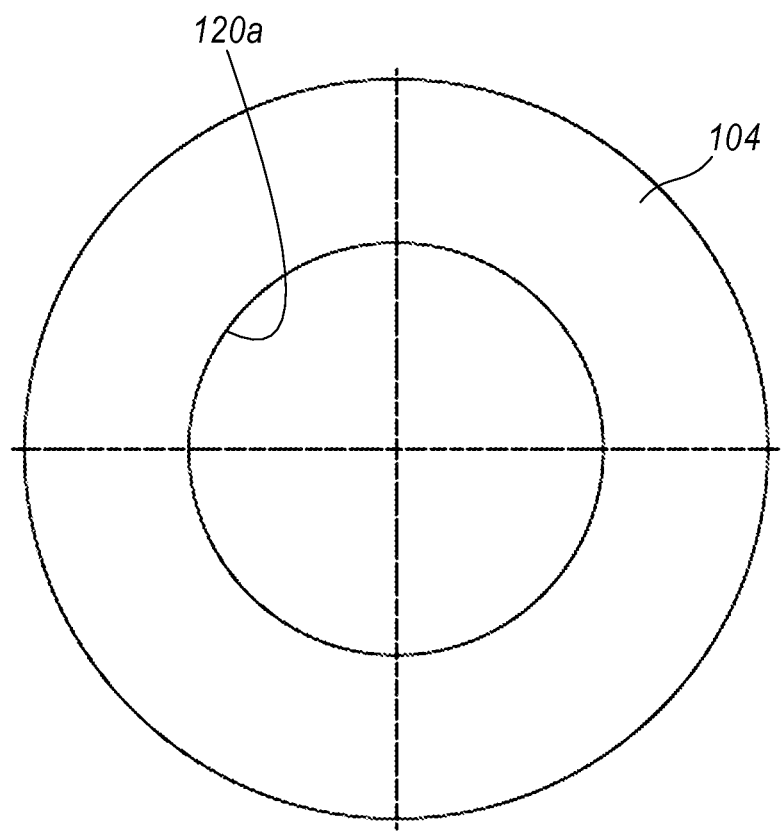
Figure 4A:
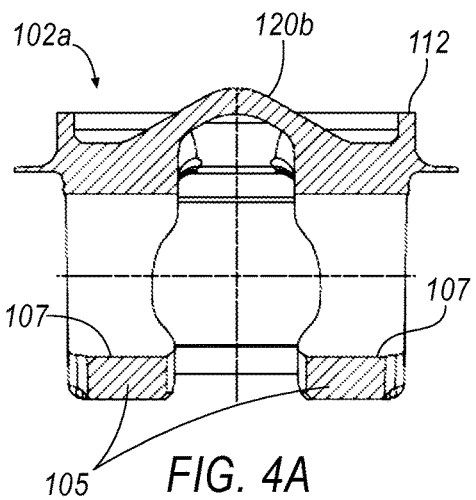
FIGS. 4A, 4B, and 4C are sectional, top, and side views, respectively, of a lower part used to form the exemplary piston of FIG. 1.
Figure 4B:
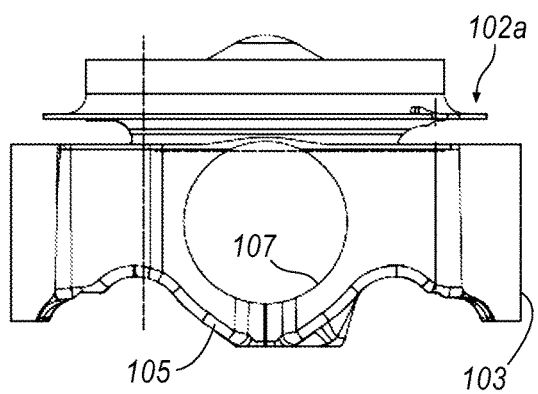
Figure 4C:
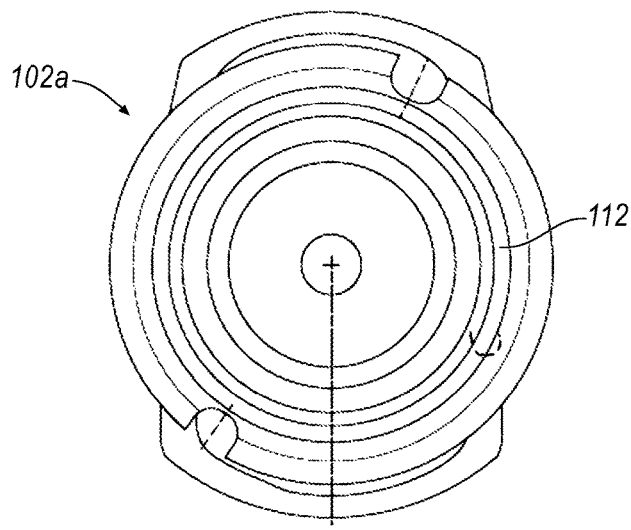

As noted above, the upper and lower piston parts 104, 102 may generally be joined in a process that relies on an electric current made to flow through the upper and lower piston parts 104, 102 adjacent the upper and lower mating surfaces 110, 112. In one exemplary approach the upper and lower piston parts 104, 102 are each initially formed, e.g. in a casting, forging or machining process, merely as examples. See, for example, FIGS. 3A and 3B, which illustrate an exemplary upper part 104, and FIGS. 4A, 4B, and 4C, which illustrate an exemplary lower part 102*a* having a lower flange 114. Moreover, the upper and lower parts 104, 102 may be formed in different forming processes, e.g. the upper part 104 may be forged while the lower part 102 is machined.

Figure 5A:
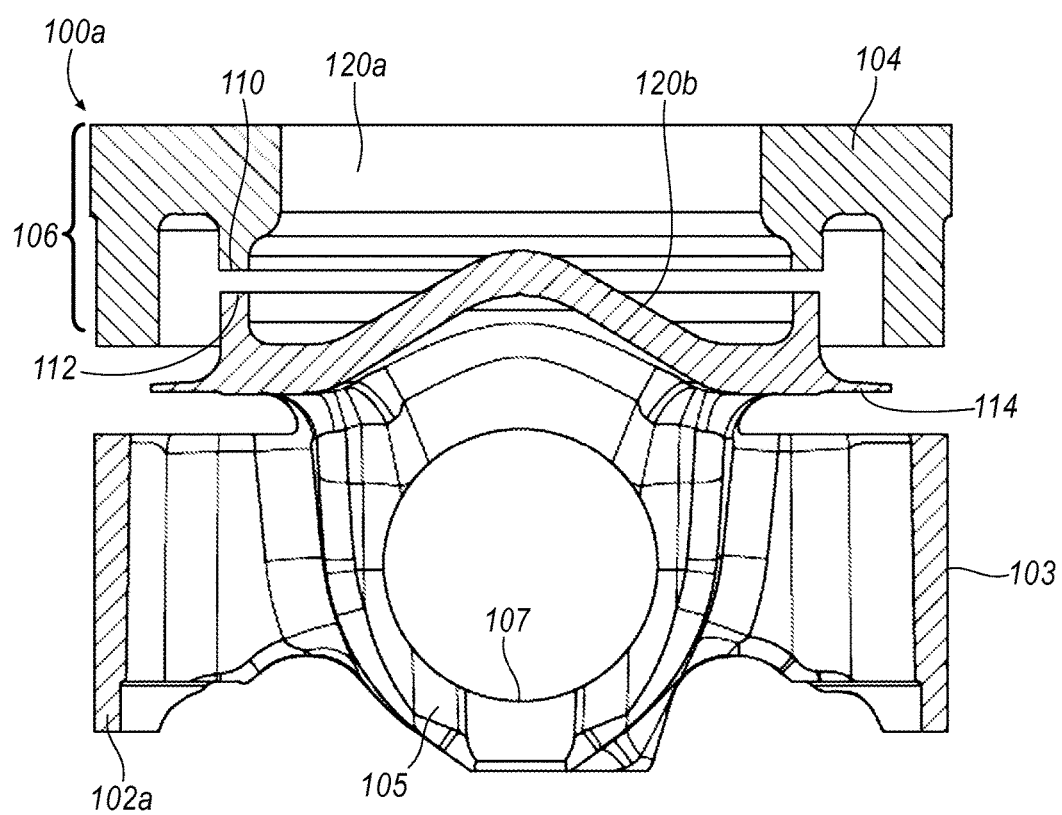
FIGS. 5A-5E illustrate an exemplary method of joining the upper and lower parts of FIGS. 3 and 4, respectively, to form the exemplary piston of FIG. 1.
Figure 5B:
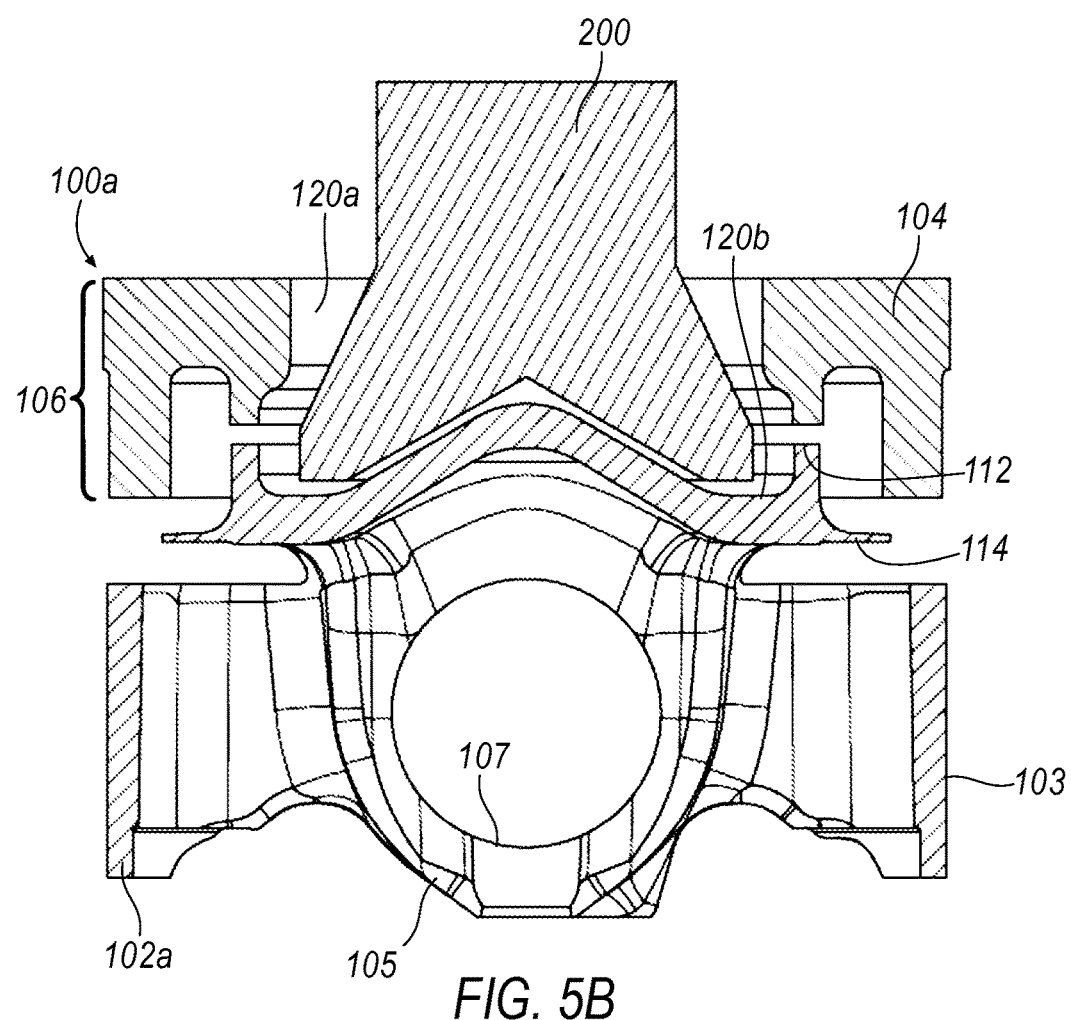
Figure 5C:
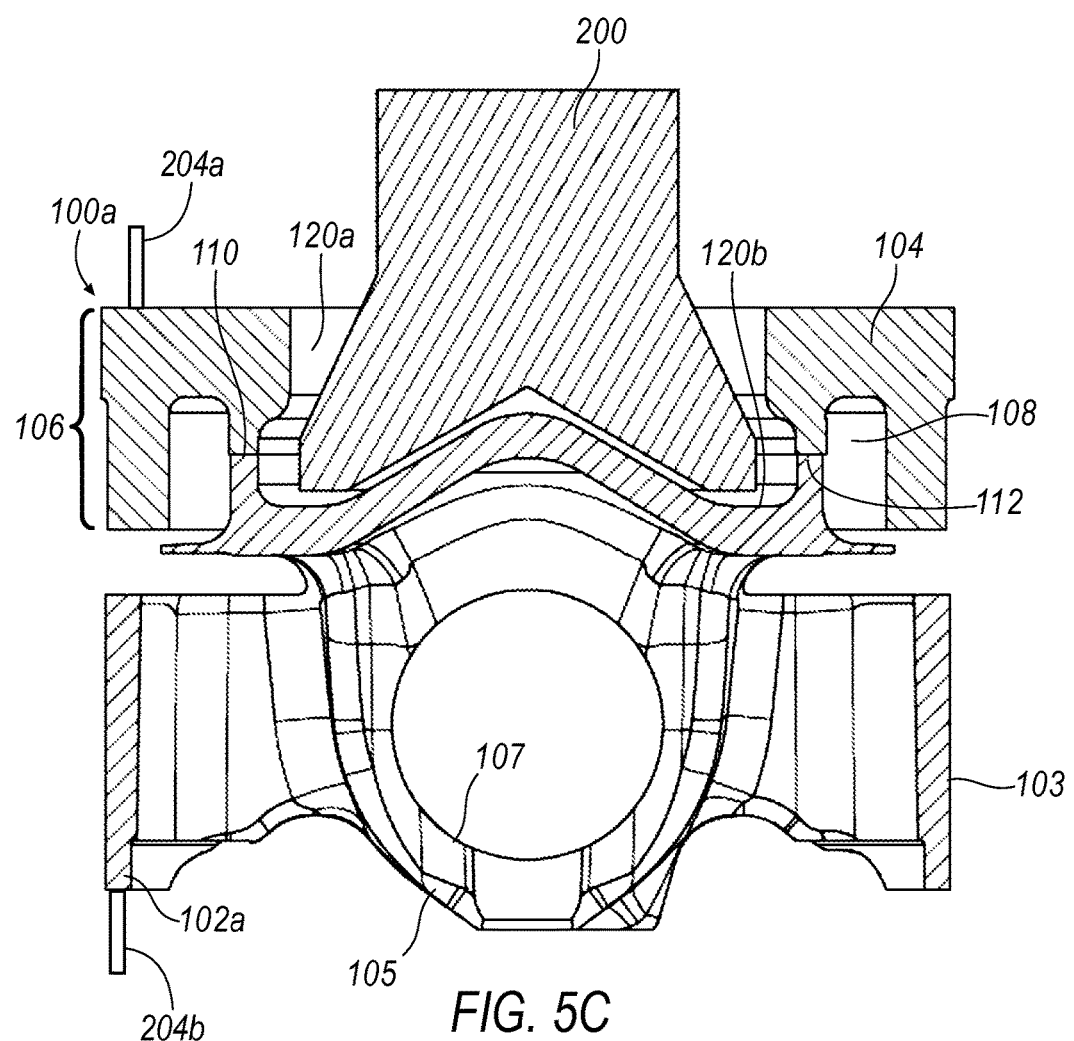
Figure 5D:
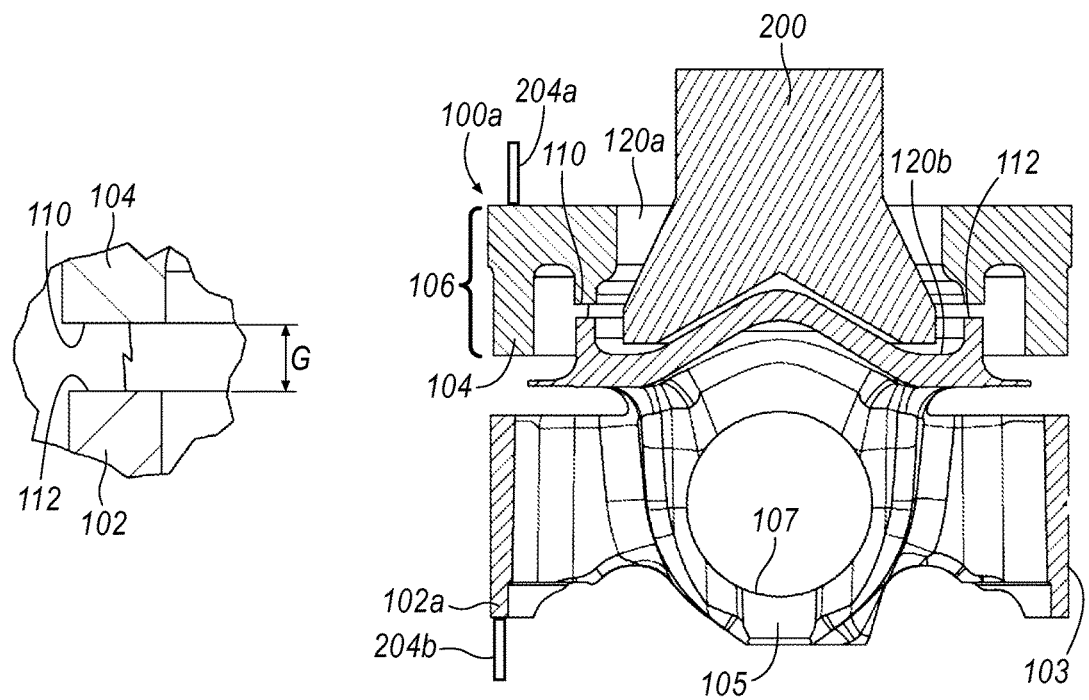
Figure 5E:
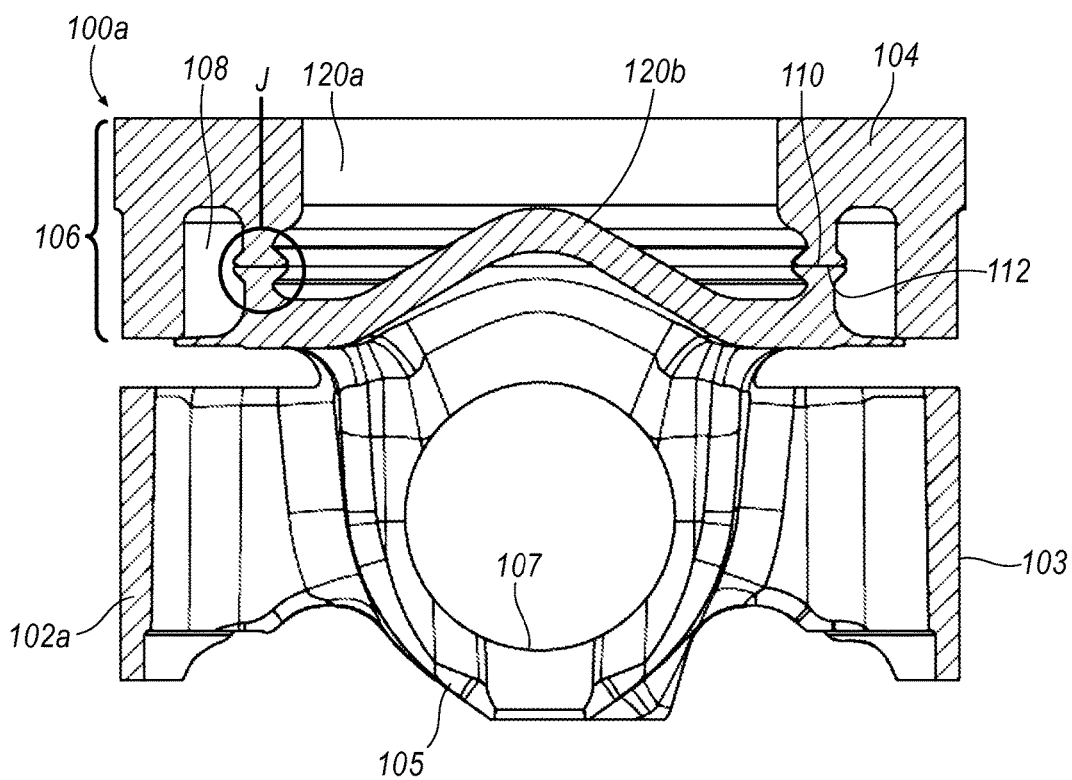
Figure 6:
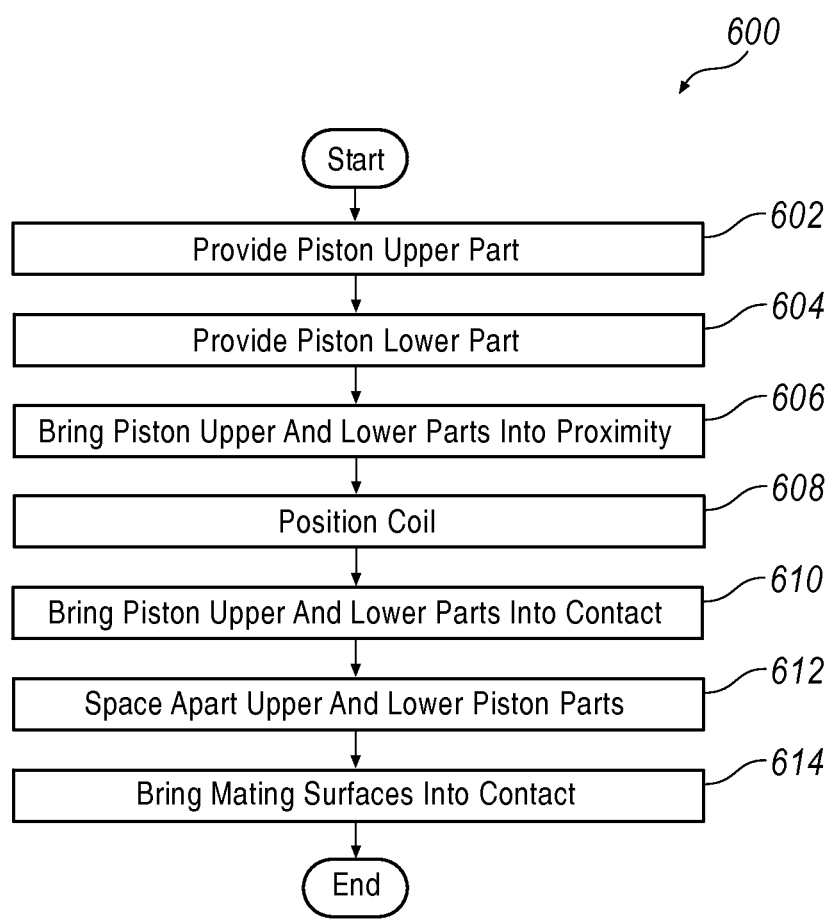
FIG. 6 is a process flow diagram for an exemplary method of making a piston.

Proceeding now to FIGS. 5A-5E and 6, an exemplary method is described. More specifically, FIG. 6 illustrates an exemplary process 600, which is generally directed to a method of making a piston 100*a*, as illustrated in FIGS. 5A-5E. Process 500 may begin at block 602, where a piston upper part is provided, e.g., upper part 104. The upper part 104 may be formed via any process, e.g., via forging, machining, casting, or sintering, merely as examples. Moreover, the upper part 104 may be formed of any material that is convenient.

Proceeding to block 604, a piston lower part 102*a*, 102*b* may be provided. The lower part 102*a*, 102*b* may be formed via any process, e.g., via forging, machining, casting, or sintering, merely as examples. Additionally, the lower part 102*a*, 102*b* may be formed of any material that is convenient. The lower part 102 may be formed of a same material or different material than the upper part 104, and may be formed in a same process or different process than the upper part 104. Process 600 may then proceed to block 606.

At block 606, the piston upper and lower parts 104, 102 may be brought into proximity to each other. For example, as shown in FIG. 5A, the upper and lower piston parts 104, 102 may initially be brought near each other, such that the upper and lower mating surfaces 110, 112 are just out of contact with each other.

Proceeding to block 608, a coil 200 may be positioned adjacent the upper and lower mating surfaces 110, 112, e.g., as shown in FIG. 5B. In one exemplary approach, a magnetic arc welding process is used to join the upper and lower mating surfaces 110, 112 of the upper and lower piston parts 104, 102. In one exemplary approach, the coil 200 does not contact the piston 100, and is close enough to the piston 100 to create a magnetic field sufficient to guide an electric arc between the upper and lower mating surfaces 110, 112, as further described below. Process 600 may then proceed to block 610.

At block 610, the upper and lower piston parts 104, 102 may be brought together, such that the upper and lower mating surfaces 110, 112 are brought into contact with one another, e.g., as shown in FIG. 5C. In one exemplary illustration, after the upper and lower mating surfaces are brought into contact with one another, an electric current may be induced across the upper and lower mating surfaces 110, 112. For example, electrodes 204*a*, 204*b* may be applied to the upper and lower piston parts 104, 102, respectively, while the upper and lower piston parts 104, 102 are in contact. While it may be possible to induce current with the coil 200, the inventors have found that inducing current across the upper and lower mating surfaces 110, 112 by contacting electrodes to the upper and lower piston parts 104, 102 may be more advantageous in some applications. Current may be applied to the upper and lower piston parts 104, 102 by the electrodes 204.

Proceeding to block 612, the upper and lower piston parts 104, 102 may be moved away from one another to define a gap between the upper and lower mating surfaces, as shown in FIG. 5D, while electrical current flows through the upper and lower piston parts 104, 102. For example, the upper and lower mating surfaces 110, 112 may be spaced apart by a relatively small distance or gap G, which in some exemplary approaches may only be a few millimeters. As a result of the spacing of the upper and lower mating surfaces 110, 112 apart while the electric current is flowing through the upper and lower mating surfaces 110, 112, an electric arc is formed between the upper and lower mating surfaces 110, 112, as also shown in FIG. 5D and best seen in the enlarged portion thereof. Moreover, a magnetic field initiated by coil 200 may drive and guide the electric arc around the circumference along the mating surfaces 110, 112 of the lower and upper piston parts 102, 104, respectively. The arc between the upper and lower mating surfaces 110, 112 may generally heat the piston upper and lower parts 104, 102 adjacent the upper and lower mating surfaces 110, 112. Accordingly, the material(s) of the piston upper and lower parts 104, 102 may generally be heated until it the material(s) of each are softened or converted to a liquid phase suitable for bonding the upper and lower parts 104, 102 together. Process 600 may then proceed to block 614.

At block 614, the piston upper and lower parts 104, 102 may be brought back into contact, joining the piston upper and lower parts 104, 102 along the upper and lower mating surfaces 110, 112. In some exemplary approaches, the upper and lower parts 104, 102 are forced together or propelled into contact, e.g., with an upset force, which generally forces the softened or liquid material together. The heated material is allowed to generally cool, re-hardening and thereby joining the piston upper and lower parts together 104, 102, along the annular joint J, e.g., as shown in FIG. 5E.

As shown in FIGS. 1, 2, and 5E, the resulting joint J between the piston upper and lower parts 104, 102 generally results in a slightly widened area adjacent the upper and lower mating surfaces 110, 112. Nevertheless, the resulting joint J is formed substantially free of any weld curls typical of previous piston parts securement approaches such as friction welding. Additionally, substantially no weld spatter is created from the process of applying and guiding the current through the upper and lower mating surfaces 110, 112. More specifically, a magnetically guided current across the upper and lower mating surfaces 110, 112 generally results in a comparatively controlled heating of the upper and lower mating surfaces 110, 112 that does not create weld curls or weld spatter, and in any case results in a relatively cleaner joint between the upper and lower piston parts 104, 102 and smaller heat affected zone. The lack of weld curls and spatter generally reduces or even eliminates the need for subsequent machining operations or cleanup operations to remove weld curls or weld spatter from the piston 100. The reduced or eliminated need for subsequent machining or cleanup of weld spatter is especially advantageous within the cooling gallery 108 of the piston 100, where space is more restricted and a smooth surface is important for minimizing disruptions in coolant flow. Additionally, the use of a magnetically guided current allows the upper and lower piston parts 104, 102 to be maintained relatively close together during the process, without any components such as a coil being between the upper and lower mating surfaces 110, 112 as the upper and lower mating surfaces 110, 112 are being heated. As a result, the upper and lower mating surfaces 110, 112 may generally be brought back into contact very quickly once the upper and lower mating surfaces 110, 112 have been sufficiently heated by the current arcing across the upper and lower mating surfaces 110, 112. Accordingly, little if any heat is lost from the heated material. In some exemplary approaches, this may provide the advantage that no additional turning or relative rotation between the upper and lower parts 104, 102 or any other enhancements to the joint J are required to obtain an adequate bond between the upper and lower piston parts 104, 102. In fact, in some examples the use of a current arcing across the upper and lower mating surfaces 110, 112 allows current to remain "on" or flowing through the mating surfaces 110, 112 until the parts are brought back into contact, with the current continuing to flow until the upper and lower mating surfaces are brought back into contact. In other words, since no components, e.g., a coil, are positioned between the upper and lower mating surfaces 110, 112 as part of the process of heating the upper and lower mating surfaces, there is generally no delay, i.e., to wait for the coil to be moved out of the way between the upper and lower parts 104, 102 before bringing the upper and lower parts 104, 102 back into contact.

Additionally, the use of a guided current across the upper and lower mating surfaces 110, 112 may allow a number of different variations and configurations of the mating surfaces 110, 112. FIGS. 1 and 2 illustrate the upper and lower surfaces as being generally planar, annularly extending surfaces. However, any other configuration compatible with applying an electrical current and guiding the current across at least a portion of the upper and lower mating surfaces may be employed.

The exemplary pistons disclosed herein may be employed in small and large bore diameter applications, generally without limitation. The reduced joint size resulting from the use of a guided current may advantageously allow for smaller overall geometry of the piston. Compression height, i.e., ratio of piston diameter to a distance between the upper surface and a center of the bore defined by the pin bosses, may be reduced. Overall height, i.e., $H_1$ and/or $H_2$ of the exemplary pistons shown in FIGS. 1 and 2, respectively, may also be reduced relative to pistons formed in other previous piston component securement approaches. For example, the minimal widening of the joint J between the piston upper and lower parts 104, 102 may also facilitate a relatively shallow bowl geometry, i.e., a reduced height of the combustion bowl 120 relative to the diameter of the piston 100. Finally, a smaller overall height and/or compression height generally reduces size and weight of the piston 100, allowing smaller engine blocks and smaller components overall, allowing greater freedom in vehicle packaging around the engine block. A longer connecting rod may also be employed where compression height is minimized, reducing lateral forces during engine operation against the engine bore. This may in turn reduce friction between the piston and the bore, improving engine efficiency. The piston assembly may also tolerate increased peak combustion pressures as a result of the rigidity of the piston assembly and the flexibility in material selection offered by the exemplary guided current approaches described herein. Manufacturing costs may also be reduced due to the simplified forging and joining processes that may be used in some exemplary illustrations.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A magnetic arc welding method, comprising:
providing a piston having a piston lower part defining a piston axis and having a combustion bowl portion and an upper piston part, wherein the combustion bowl portion includes a lower flange extending radially outwardly;
positioning the piston upper part in proximity to the piston lower part, wherein the piston upper and lower parts cooperate to define at least in part a cooling gallery extending annularly about the piston axis, wherein an upper surface of the lower flange extends underneath a lower surface of the piston upper part and radially external to the cooling gallery;
bringing the piston upper and lower parts together along respective upper and lower mating surfaces that are radially external to the cooling gallery, thereby partially forming the cooling gallery between the upper and lower parts, the upper and lower parts further defining a combustion bowl radially internal to the cooling gallery, wherein the upper and lower mating surfaces form a single circumferential contact area that extends from the combustion bowl to the cooling gallery;
connecting electrodes to the upper and lower piston parts for providing electric current;
positioning a magnetic coil within the combustion bowl;
inducing an electric current generated from the magnetic coil through the single circumferential contact area after bringing the upper and the lower mating surfaces in contact;
after the electric current is induced, spacing the upper and lower mating surfaces apart to form a gap between the upper and lower mating surfaces, thereby forming and maintaining an electric arc between the upper and lower mating surfaces, wherein the electric arc heats the upper and lower mating surfaces to a melt temperature; and
after the upper and the lower mating surfaces are at least softened, bringing the upper and lower mating surfaces back together to join the upper and lower mating surfaces and form a weld joint at the single circumferential contact area, and to bring the upper surface of the lower flange in contact with the lower surface of the piston upper part to fully form the combustion bowl and enclose the cooling gallery with the lower surface of the piston upper part thereof.

2. The method of claim 1, wherein the piston lower part includes a skirt configured to interface with an engine bore surface.

3. The method of claim 1, wherein the piston upper and lower parts are each formed of a steel material.

4. The method of claim 1, wherein the piston upper part is formed of a first material, and the piston lower part is formed of a second material different from the first material.

5. The method of claim 1, further comprising guiding the electric arc between the upper and lower mating surfaces with a magnetic field initiated by the magnetic coil.

6. A magnetic arc welding method, comprising:
providing a piston having a piston lower part defining a piston axis and having a combustion bowl portion and an upper piston part, wherein the combustion bowl portion;
assembling a piston upper part to the piston lower part, wherein the piston upper and lower parts cooperate to define at least in part a cooling gallery extending annularly about the piston axis, wherein the piston lower part includes a lower flange extending radially outwardly and radially external to the cooling gallery;
bringing the piston upper and lower parts together along respective upper and lower mating surfaces that are radially external to the cooling gallery, thereby partially forming the cooling gallery between the upper and lower parts, the upper and lower parts further defining a combustion bowl radially internal to the cooling gallery, wherein the upper and lower mating surfaces form a single circumferential contact area that extends from the combustion bowl to the cooling gallery;
connecting electrodes to the upper and lower piston parts for providing electric current;
positioning a magnetic coil within the combustion bowl;
inducing an electric current generated from the magnetic coil through the single circumferential contact area after bringing the upper and lower mating surfaces in contact;
after the electric current is induced, spacing the upper and lower mating surfaces apart, thereby forming and maintaining an electric arc between the upper and lower mating surfaces, wherein the electric arc heats the upper and lower mating surfaces to a melt temperature; and
after the upper and the lower mating surfaces are at least softened, joining the upper and lower mating surfaces together at the single circumferential contact area until an upper surface of the lower flange is in contact with the lower surface of the piston upper part to form a weld joint between the upper and the lower mating surfaces, and to enclose the cooling gallery with the lower surface of the piston upper part thereof.

7. The method of claim 6, wherein the piston lower part includes a skirt configured to interface with an engine bore surface.

8. The method of claim 6, wherein the piston upper part is formed of a first material, and the piston lower part is formed of a second material different from the first material.

9. The method of claim 1, wherein the lower flange forms an unwelded portion of the cooling gallery.

10. The method of claim 1, wherein the contact area extends in a direction that is approximately orthogonal to the piston axis, and bringing the piston upper and lower parts into contact further comprises forming the contact area along an arcuate surface of the combustion bowl.

11. The method of claim 6, wherein the lower flange forms an unwelded portion of the cooling gallery.

12. The method of claim 6, wherein the contact area extends in a direction that is approximately orthogonal to the piston axis, and bringing the piston upper and lower parts into contact further comprises forming the contact area along an arcuate surface of the combustion bowl.

13. The method of claim 1, wherein positioning the magnetic coil comprises positioning the magnetic coil between the upper and lower mating surfaces.

14. The method of claim 6, wherein positioning the magnetic coil comprises positioning the magnetic coil between the upper and lower mating surfaces.

\* \* \* \* \*